United States Patent Office 3,238,090
Patented Mar. 1, 1966

3,238,090
INHIBITING THE GROWTH OF FUNGI WITH ADDUCTS OF SYM-DICHLOROTETRAFLUOROACETONE WITH SELECTED MERCAPTANS
Karoly Szabo, Orinda, Calif., and Larry J. Senior, Champaign, Ill., assignors to Stauffer Chemical Company, New York, N.Y., a corporation of Delaware
No Drawing. Filed Jan. 20, 1964, Ser. No. 338,592
5 Claims. (Cl. 167—22)

This invention relates to the control of microorganisms such as fungi and the like. More particularly, this invention pertains to such use of fungicidal compositions having as their active component the addition products as represented by the following formula

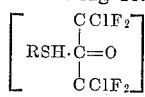

wherein R represents hydrogen, an alkyl radical, a phenyl radical or phenalkyl radical.

These compounds can be conveniently prepared by bringing the reactants, i.e., the tetrafluorodichloroacetone and selected mercaptan, into contact with one another. The reaction is easily carried out in the presence of a normally liquid inert organic solvent. In many cases no solvent need be used as the selected mercaptan can act as the solvent media of the reaction. Generally, the components tend to combine exothermically with a slight amount of heat given off. The reaction temperature can be readily controlled by applying a cooling bath or the like to withdraw the surplus heat. Since the adducts of the present invention are not stable at higher temperatures, care should be taken to control the temperature. It is preferred to maintain the temperature at about 10° to 45° C. When adequate care is exercised the products can be obtained in very high yields and technical purity in spite of the heat sensitivity shown by the adducts.

The exact nature of the fluorochloroacetone-mercaptan adducts of the present invention have not as yet been determined. The evidence gathered thus far indicates them to be a type of addition products, since their formation is not accompanied by the elimination or formation of any detectable by-products. The infrared spectra of the adducts shows the possibility of their being carbonyl adducts of the halogenated acetone, that is, semi-mercaptols. The above mentioned suggestions, as regards the chemical nature of the compounds of the present invention, are made merely as a point of interest and any further discussion along theoretical lines as to the absolute proof of their structure will be foregone in lieu of more substantial evidence. It should be pointed out, however, that the formulations of the present invention are not promiscuous, but instead are discrete compositions.

The method of preparing representative compounds of the present invention, as well as the manner of using them in fungicidal compositions, is illustrated in the following examples. Compound numbers have been assigned corresponding to the example number wherein the preparation of the adduct is described.

EXAMPLE 1

Sym.-dichlorotetrafluoroacetone (20 g.) was diluted with acetone (100 ml.) and the mixture was saturated with hydrogen sulfide gas. At the beginning the hydrogen sulfide was absorbed completely with the evolution of a small amount of heat. When the temperature of the mixture began to drop, the solvent was removed at reduced pressure (15 mm.) by warming the mixture to 40° C. (Higher temperatures, as noted earlier, over 50° C. induce decomposition.) There was obtained 17 g. of an almost colorless oil (hydrogen sulfide·sym.-dichlorotetrafluoroacetone), adduct, with a refractive index of 1.4038 at 26° C.

EXAMPLE 2

In a similar manner as Example 1, ethyl mercaptan (10.3 g.) and sym.-dichlorotetrafluoroacetone (333 g.) were combined in 50 ml. of benzene. An exothermic reaction followed which raised the temperature of the mixture to 43° C. The mixture was then allowed to cool to room temperature and the solvent was removed at reduced pressure. The resulting yellow oily product had a refractive index of 1.4320 at 25° C. The compound is the adduct (ethyl mercaptan·sym.-dichlorotetrafluoroacetone). *Analysis.*—Calculated: C, 23.0; H, 2.3; Cl, 27.2; S, 12.27. Found: C, 23.17; H, 2.27; Cl, 26.41; S, 12.51.

EXAMPLE 3

Sym.-dichlorotetrafluoroacetone (66.5 g.) and phenyl mercaptan (36.6 g.) were brought together in 80 ml. of benzene. A slight temperature increase followed. The mixture was allowed to stand at room temperature for 2 hours, then the solvent was removed at reduced pressure and avoiding temperatures above 45° C. There was obtained a light yellow oil with a refractive index of 1.5160 at 25° C. The product was (phenyl mercaptan·sym. - dichlorotetrafluoroacetone) adduct. The yield was nearly theoretical. The analysis confirmed at 1:1 combination ratio.

EXAMPLE 4

Sym.-dichlorotetrafluoroacetone (40 g.) was added gradually to benzyl mercaptan (24.6 g.) without using a solvent. An exothermic reaction took place, raising the temperature of the mixture to 64° C. The mixture was allowed to cool down to room temperature and placed under vacuum (0.1 mm.) at 45° C. for a short period. No volatile component was trapped. The product (benzyl mercaptan·sym.-dichlorotetrafluoroacetone), adduct, was a yellow oil with a refractive index of 1.5085 at 24° C.

The compositions of the present invention were tested as fungicides as described in the following tests.

*Foliage fungicide test.*—This test indicates protectant action as well as eradicant and leaf systemic action against fungi attacking plant foliage. Exactly which action is operating is determined by evaluation tests. Pinto bean plants are sprayed with three concentrations of dissolved or suspended chemical in water, 1000, 500 and 100 parts per million. The active compound is dissolved in water, and for this purpose it is recommended that a surface active agent or wetting agent be employed to facilitate formulation of the dispersions. After the sprayed plants are dried they are inoculated with bean rust or powdery mildew spores. Development of the rust infection requires overnight treatment in a mist chamber following inoculation. Results are read when disease symptoms are distinct on untreated bean plants. The results are recorded as 100 which signifies no pustule or mildew formation; ++++ which indicates 75–100% control; +++ 50–75% control; ++ 25–50% control; + 5–25% control, and 0 no visible control.

*Foliage weathering test.*—To be of promise in commercial applications a compound must be capable of remaining on sprayed plants for a given length of time under various weathering conditions. Chemicals that are immediately hydrolyzed, volatilized, or otherwise inactivated make poor protectant fungicides. Although formulation and additives may aid the weathering ability of a compound, there must be some inherent weathering capacity present. The simulated weathering test tends to be more gentle than actual conditions; however, after two days and two nights in the mist chamber, definite results will be evident. The treated and weathered pinto bean plants were inoculated with bean rust and thus allowed to develop disease symptoms. Data was gathered as in the screening test.

*Eradicant foliage fungicide test.*—Compounds that eliminate visible fungus infection are often preferred by users who do not want to apply compounds for what might be needless protection at considerable expense. Although an eradicant that protects against infection after fungus eradication is the most desirable, it is not always necessary. Candidate compounds were tested at 1000, 500 and 100 p.p.m. on established bean rust. The results were noted and recorded as in the foliage fungicide test above.

The results of the aforementioned tests are given in Table I.

TABLE I

| Compound No. | Foliage Fungicide Test | | | | | | Foliage Weathering | | | Eradicant Test | | |
|---|---|---|---|---|---|---|---|---|---|---|---|---|
| | Percent Control | | | | | | Percent Control Rust | | | Percent Control Rust | | |
| | Rust | | | Mildew | | | | | | | | |
| | 1,000 | 500 | 100 | 1,000 | 500 | 100 | 1,000 | 500 | 100 | 1,000 | 500 | 100 |
| 1 | 100 | 100 | +++ | ++++ | ++ | 0 | 100 | 100 | 100 | | | |
| 2 | 100 | 100 | 100 | ++ | + | 0 | 100 | 100 | 100 | 100 | ++++ | ++++ |
| 3 | 100 | 100 | 100 | +++ | ++ | + | 100 | 100 | ++++ | 100 | 100 | ++++ |
| 4 | 100 | 100 | 100 | +++ | ++ | + | 100 | 100 | ++++ | ++++ | ++++ | ++++ |

*Systemic foliage fungicide test.*—This test measures the fungicidal activity of compounds that move systemically, i.e., root absorption and upward translocation, in a plant after introduction through the roots. In carrying out these tests, sixty ml. of solution containing the candidate systemic compound diluted to 50 parts per million in distilled water was placed into each of four test tubes. A Pinto bean plant was placed in each tube, using a cotton plug to support the seedling and to prevent evaporation of the water. After 48 hours two plants were inoculated with rust and two with powdery mildew. Compounds exhibiting 100% control at this 50 p.p.m. concentration were evaluated at lower concentrations. Table II contains the results of the systemic fungicide tests.

*Soil drench evaluation test.*—Other than mixing or injecting a compound into the soil, the candidate can be applied as a water drench. The soil drench evaluation test is carried out by mixing a compound into the soil after application in the form of a water drench. In this test the concentrations were diluted to the lowest value that will demonstrate fungicidal activity. Pinto beans with rust infection were used. The concentrations are reported in Table II under Soil Drench-Rust.

TABLE II

| Compound Number | Systemic Fungicide Test (parts per million) | | Soil Drench (parts per million), Rust |
|---|---|---|---|
| | Rust | Mildew | |
| 1 | 1 | 10 | |
| 2 | 50* | 50* | |
| 3 | 10* | 25 | (.75) |
| 4 | 10* | 25 | *.75 |

(*) = Lowest concentration tested.
( ) = Partial control.

The adduct compounds of the present invention find particular utility as fungicides and may be applied in a variety of ways at various concentrations. They may be combined with suitable carriers and applied as dusts, sprays or drenches. The amount applied will depend upon the nature of the utility. The rate of application may also vary with the microbiological use intended.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. The method of inhibiting the growth of fungi, comprising applying thereto an effective amount of the adduct

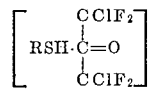

wherein R is a member selected from the group consisting of hydrogen, alkyl, phenyl and phenalkyl radicals.

2. A method of inhibiting the growth of fungi, comprising applying thereto an effective amount of the adduct (ethyl mercaptan·sym.-dichlorotetrafluoroacetone).

3. A method of inhibiting the growth of fungi, comprising applying thereto an effective amount of the adduct (hydrogen sulfide·sym.-dichlorotetrafluoroacetone).

4. A method of inhibiting the growth of fungi, comprising applying thereto an effective amount of the adduct (phenyl mercaptan·sym.-dichlorotetrafluoroacetone).

5. A method of inhibiting the growth of fungi, comprising applying thereto an effective amount of the adduct (benzyl mercaptan·sym.-dichlorotetrafluoroacetone).

References Cited by the Examiner

UNITED STATES PATENTS

| 2,553,778 | 5/1951 | Hawley | 167—22 |
| 2,763,097 | 9/1956 | Meuli | 47—58 |
| 2,854,467 | 9/1958 | Harmon | 260—455 |
| 2,864,738 | 12/1958 | Scott | 167—22 |
| 2,911,414 | 11/1959 | Simmons | 260—327 |
| 2,970,941 | 2/1961 | Holbrook | 167—30 |
| 2,874,082 | 3/1961 | Collins | 167—22 |
| 3,024,159 | 3/1962 | Bollenback et al. | 162—161 |

OTHER REFERENCES

Ihara: Japan 10, 197 (1959) Nov. 18, 1959, abstracted in English in Chem. Abstracts 54; page 158 19F (1960).

Pesticidal Chloroacetates of Phenyl Mercaptans: Ihara, Japan 2300 (1959) April 9, 1959, abstracted in English in Chem. Abstracts 54, page 14566C (1960).

LEWIS GOTTS, *Primary Examiner*,